United States Patent Office
3,712,821
Patented Jan. 23, 1973

3,712,821
PRODUCTION OF FISHERIES PRODUCTS
Louis J. Ronsivalli, Lawrence, and Robert J. Learson, Hamilton, Mass., assignors to the United States of America as represented by the Secretary of the Interior
No Drawing. Filed Jan. 5, 1970, Ser. No. 798
Int. Cl. A23l 1/325
U.S. Cl. 99—111
9 Claims

ABSTRACT OF THE DISCLOSURE

Presently undesirable species of fish, shellfish and crustaceans and process-degraded flesh fractions therefrom are reconstituted to form a highly desirable food product having characteristics of natural fisheries products. These reconstituted products will withstand heat sterilization, refrigerated storage and subsequent cooking without crumbling.

BACKGROUND OF THE INVENTION

At the present time, there is no satisfactory method for maintaining the physical integrity of a fisheries product through heat processing, refrigerated storage and subsequent cooking. It is almost mandatory that fisheries products be stabilized against autolysis prior to extended storage. Stabilization requires the inactivation of naturally occurring enzymes and this is most conveniently done by heat. Heat, however, literally disassembles flesh portions such as fish fillets into muscle segments by destroying the connective tissue between segments.

In the preparation of fisheries products, it is often desirable to bind together small segments or particles of flesh to form a larger or differently shaped product. Generally the desired size and shape of the product is governed by both practical and esthetic considerations. It is of great convenience, especially in the marketing or serving of cooked fisheries products, that the product portions be of relatively uniform size and shape. Custom dictates also that particular products have a traditional size and shape. A scallop, especially a reconstituted scallop, must look like a scallop to be acceptable.

A host of different binding materials and techniques have been used in the past. Breading techniques have been used but are undesirable since the breading becomes soggy upon thawing and the product tends to fall apart. Natural gums such as guar and the like have been used but they tend to give the product a slimy appearance and feel. Proteinaceous materials such as egg albumen have been traditionally used as binders in all types of food preparations. Egg albumen tends to give a decided crusty appearance and texture upon cooking and often affects the flavor. Other naturally occurring binder materials used in the past include alginates, enzymes and proteins derived from milk and vegetable sources.

None of these materials is completely satisfactory for use in binding fishery products. Some lose their binding qualities upon heating. Some drastically change the texture of the final product. Others add distinctive tastes or aromas to the fishery product; especially those products which have delicate or subtle flavors.

SUMMARY OF THE INVENTION

It has been found that flesh from fish, mollusks and crustaceans may be bound together with a binder paste prepared by comminuting the flesh of these same animals. Relatively small flesh pieces are mixed with binder paste and shaped by mold pressing into a product having the desired size and configuration. This reconstituted product maintains its physical integrity during heat processing, refrigerated storage and subsequent cooking.

In another embodiment of the invention, species which are unacceptable for general food use because of flavor or size may be compounded with other compatible species to form a very acceptable product.

Hence, it is an object of this invention to provide a process for preparation of fisheries products which maintain their physical integrity during processing and subsequent storage and cooking.

It is a further object of this invention to provide a method for the utilization of presently unacceptable marine species.

DETAILED DESCRIPTION OF THE INVENTION

Broadly, this invention comprises a process for preparing fisheries products which will maintain physical integrity during processing, storage and cooking while substantially duplicating taste and texture of the natural meat. In a first embodiment of the invention, product portions of uniform and predetermined size and shape are produced from smaller flesh portions of fish, mollusks, crustaceans and mixtures of these. Small flesh pieces are bound together with an adhesive binder paste prepared by comminuting portions of the meat of those marine animals. The binder paste conveniently may be prepared by comminuting flesh portions in a high shear type of mixer together with sufficient water to form a relatively thick, homogeneous paste.

Binder paste is then added to the flesh pieces and gently mixed until each flesh piece is coated with the binder paste. Product portions are then formed by pressing the coated flesh pieces in a mold or other suitable forming device and heated to about 150° F. to seal or set the binder. The product temperature is not critical and is determined by the texture desired in the product and whether or not additional processing is to be done. Generally 120° F. to 180° F. would be used for most applications. The product portions may then be stored under normal refrigerated storage, frozen storage or room temperature storage after being heat sterilized or radiosterilized. After refrigerated storage the product portions may be thawed and cooked in a conventional manner without the crumbling and disintegration normally encountered. Adhesion of the binder paste may be enhanced by scratching or abrading the surfaces of the individual flesh pieces prior to mixing with the binder paste. Amount of binder paste used is not critical and is determined by the texture desired in the product and by the size of the flesh pieces used in the process. Generally, binder paste will comprise from about 5 to about 25% of the product.

In another embodiment of the invention, process-degraded flesh portions of fishery products are reconstituted to a more natural and acceptable form. Mechanized peeling or shelling of crabs and other crustaceans often produces at least a portion of the recovered flesh in relatively small pieces or segments. These small segments are not considered as desirable nor do they command nearly so high a price as do the larger chunk portions of meat. A reconstituted chunk product may be prepared by mixing the small meat segments with a binder paste preferably prepared from the flesh of a bland fish such as haddock, cod or pollack.

Yet another embodiment of the invention comprises utilizing species of crustaceans and mollusks generally considered to be undesirable for food use. Some mollusks, such as the ocean quahog, have too strong a flavor to be generally acceptable. However, a highly acceptable, and even premium, product may be produced by binding chunks of quahog flesh in admixture with chunks of a bland fish such as cod, haddock, or pollack. Binder paste preferably is derived from fish flesh and in one embodiment the product is desirably shaped in the form and size of a scallop or clam.

Other species are under utilized because of their size. Many varieties of shrimp such as those found off the coast of Maine are too small to be acceptable in traditional markets. Yet these shrimp are in abundant supply and can be mechanically processed to yield a high quality meat. By the techniques of this invention, these small shrimp may be formed into a loaf or roll using a binder paste derived from a bland fish.

Following are examples of the use of a comminuted fish paste as a binder in fisheries products.

Example 1

A number of binder pastes were prepared and evaluated. In each case, fish flesh was comminuted in a shearing-type mixer. It was found that binder pastes of good consistency and homogeneity were produced with mixtures of fish flesh and water in the proportions of about 1 part fish to about 1 to 3 parts water.

Adhesive properties of the binder pastes for marine flesh were determined to be primarily a function of the water content of the paste and the degree of comminution of the fish flesh. More dilute pastes had less adhesive power but were generally easier to mix with flesh segments. As the degree of comminution increased, it was possible to obtain progressively greater adhesive properties. Extended comminution of the fish paste produced a binder giving almost a rubbery texture to the product. By simple experimentation, it was possible to obtain any desired degree of adhesive properties and to substantially duplicate the texture of natural products.

It was found that scratching or abraiding the surfaces of individual pieces or segments of flesh making up a composite product had the effect of increasing the binding qualities of the pastes. Products prepared by binding small flesh pieces into a larger fillet or loaf configuration could be heat sterilized, frozen, stored, thawed and cooked without flaking or disintegration. Evaluation of the product by test panels concluded that taste and texture substantially duplicated natural products.

Example 2

The ocean quahog is a clam found in plentiful supply off the northern coast of the United States. This clam is characterized by a very strong flavor making it unacceptable for general food use. Hence, at the present time it remains a relatively unexploited food source. However, these clams may be processed to form a very acceptable, or even premium food product by blending their flesh with that of a bland fish such as haddock or cod. The blended flesh particles are bound together or reconstituted to form a product having a texture closely approximating natural flesh. The processing is carried out as follows:

Quahog meat is finely diced or coarsely ground and is then mixed with similarly prepared flesh of a bland fish; preferably haddock or cod. A binder paste prepared by thoroughly comminuting fish flesh with sufficient water to form a thick paste is then added to the mixture of quahog and fish with gentle but thorough stirring. The resulting mixture is formed into appropriately shaped and sized portions.

Flavor of the finished product is controlled by varying the proportion of quahog to fish. It has been found that a ratio of about 15 parts quahog to about 85 parts haddock produces a product virtually indistinguishable in taste and aroma from the traditionally utilized clam species. Texture of the product can be tailored to substantially correspond to that of natural meat by adjusting the degree of comminution of the binder paste and of the amount of binder used. Generally, the amount of binder paste necessary will range from about 5–20% of the finished product and most desirably will range from about 10 to 15%.

Example 3

Crab meat in the form of large segments or lumps, often known as "backfin" meat, is highly prized and commands top market prices. Extraction of this lump meat by hand is no longer economical so a variety of sophisticated machines have been developed for this purpose. Even so, a significant portion of the meat is recovered in shredded form marketable only at a much lower price. In another inherently simpler approach, meat is recovered mechanically with no attempt being made to recover it in lump form. Basically this approach is to mechanically crush the cleaned, meat-containing crab shells to form a mixture of shell splinters and meat shreds. Meat is then separated from the shell by pneumatic techniques such as flotation or centrifugation.

Shredded meat recovered from Maryland blue crabs by mechanical means, such as described above, was reconstituted to form large segments or lumps in the following manner. A portion of fish flesh was mixed with water and was comminuted by intense mechanical mixing to form a thick paste. Ratio of water to fish flesh is not critical but about 1 to 2 parts of water per part of fish flesh forms a paste having about the right consistency. The variety or species of fish desirably is one having a bland taste so as not to noticeably affect the distinctive crab flavor. Cod and haddock are particularly desirable for this purpose.

Shredded crab meat was dispersed in the fish paste in an amount equal to about 7 parts of crab meat per part of paste. After gentle but thorough mixing, the preparation was mechanically formed into lumps or segments similar in size and shape to those naturally recovered from crabs. After cooking, evaluation panels could not distinguish any significant differences in odor, taste or texture between natural crab meat and the reconstituted product.

Texture of the reconstituted product is controlled both by the quantity of binder paste used relative to the crab meat and by the degree of comminution of the fish paste. In order to substantially duplicate natural crab meat texture, it has been found that the ratio of crab meat to fish paste should be from about 5 to about 12 parts of crab meat per part of fish paste. Particularly preferred is a ratio of about 7 parts of crab meat per part of fish paste.

Example 4

Small, shelled, Maine shrimp were mixed with a fish binder paste using essentially the same techniques as described in Example 3. The mixture was formed into a roll by gentle pressing and was then cooked to an internal temperature of 150° F. After normal refrigerated storage the product was sliced into ¼ inch slices, breaded, and deep fat fried. Taste and texture of the cooked product was considered to be excellent by evaluation panels.

What is claimed is:

1. A process for preparing a fisheries product which will retain its physical integrity during refrigerated storage and subsequent cooking which consists of the following sequential steps:
    (a) comminuting a portion of fish flesh in admixture with sufficient water to form a homogeneous binder paste having a ratio of comminuted fish flesh to water of about 1:1 to 1:5;
    (b) mixing relatively small pieces of the flesh of marine animals chosen from the group consisting of mollusks, fish, crustaceans, and mixtures thereof with a sufficient amount of said binder paste to coat each flesh piece;
    (c) pressing the mixture to form a product portion of predetermined size and shape, and
    (d) heating the product to an internal temperature in the range of 120 to 180° F. to seal the binder.

2. The process of claim 1 wherein the surface of each flesh piece is scored or abraided prior to admixture with the binder paste.

3. The process of claim 1 wherein the flesh pieces comprise a mixture of ocean quahog and a bland-tasting fish.

4. The process of claim 3 wherein quahog comprises a minor portion of the flesh pieces.

5. The process of claim 4 wherin the bland-tasting fish is chosen from the group consisting of haddock, cod and pollack.

6. The process of claim 5 wherein the mixture is formed into product portions conforming generally in size and shape to scallops or clams.

7. The process of claim 1 wherein the flesh pieces comprises relatively small segments of crab meat.

8. The process of claim 7 wherein the ratio of binder paste to crab meat is in the range of about 1 to 5 to about 1 to 12.

9. The process of claim 1 wherein the flesh pieces comprise small shrimp.

References Cited
UNITED STATES PATENTS

| | | | |
|---|---|---|---|
| 1,608,832 | 11/1926 | Birdseye | 99—111 |
| 1,989,383 | 1/1935 | Schuh | 99—111 |
| 1,713,279 | 5/1929 | Gorton | 99—111 |
| 3,432,311 | 3/1969 | Gruner | 99—208 |

RAYMOND N. JONES, Primary Examiner

R. M. ELLIOTT, Assistant Examiner